(12) United States Patent
Ju et al.

(10) Patent No.: US 8,269,468 B2
(45) Date of Patent: Sep. 18, 2012

(54) CHARGING CIRCUIT HAVING A SMOOTH CHARGING TRANSITION MODE INCLUDING A CURRENT MIRROR BLOCK CONTROLLED BY A CHARGE MODE TRANSITION BLOCK COMPRISING SERIES CONNECTED TRANSISTORS

(75) Inventors: Ho-Jung Ju, Seoul (KR); Jung-Woo Ha, Goyang-si (KR); Jin-Sub Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 355 days.

(21) Appl. No.: 12/636,217

(22) Filed: Dec. 11, 2009

(65) Prior Publication Data

US 2010/0171469 A1    Jul. 8, 2010

(30) Foreign Application Priority Data

Jan. 7, 2009    (KR) .................. 10-2009-0001129

(51) Int. Cl.
*H02J 7/06* (2006.01)
(52) U.S. Cl. ........ 320/164; 320/150; 320/152; 320/162; 320/163
(58) Field of Classification Search .................. 320/150, 320/152, 162–164
See application file for complete search history.

(56) References Cited

U.S. PATENT DOCUMENTS

| | | | | |
|---|---|---|---|---|
| 6,154,012 A * | 11/2000 | Drori | ............................ | 320/162 |
| 6,522,118 B1 * | 2/2003 | Barcelo et al. | ................ | 323/316 |
| 6,570,372 B2 * | 5/2003 | Barcelo et al. | ................ | 323/316 |
| 6,700,364 B2 * | 3/2004 | Barcelo et al. | ................ | 323/316 |
| 6,819,094 B2 * | 11/2004 | Barcelo et al. | ................ | 323/316 |
| 7,498,771 B2 * | 3/2009 | D'Arrigo et al. | ............. | 320/128 |
| 7,548,041 B2 * | 6/2009 | Zemke et al. | ................. | 320/133 |
| 7,564,219 B2 * | 7/2009 | Choi et al. | ..................... | 320/128 |
| 7,598,710 B2 * | 10/2009 | Zhang | ........................... | 320/137 |
| 7,696,726 B2 * | 4/2010 | Huang et al. | .................. | 320/139 |
| 7,705,563 B2 * | 4/2010 | Ibaraki | ......................... | 320/128 |
| 7,893,654 B2 * | 2/2011 | Huang | .......................... | 320/107 |
| 2006/0145665 A1 * | 7/2006 | Zemke et al. | ................. | 320/133 |
| 2007/0182366 A1 * | 8/2007 | Lee | ............................... | 320/107 |
| 2007/0182375 A1 * | 8/2007 | Lee | ............................... | 320/130 |

(Continued)

FOREIGN PATENT DOCUMENTS

JP        2004-274874        9/2004

(Continued)

*Primary Examiner* — Drew A Dunn
*Assistant Examiner* — Manuel Hernandez
(74) *Attorney, Agent, or Firm* — Myers Bigel Sibley & Sajovec, P.A.

(57) ABSTRACT

A charging circuit includes a current mirror block configured to charge a load in response to a control voltage applied thereto, and a charge controller configured to generate the control voltage in response to comparison result values obtained by comparing a current sensing value and a voltage sensing value of the current mirror block with respective reference values. The comparison result value are applied to the gates of MOS transistors connected in series. The charge controller is configured to switch a charge mode from a constant current charge mode to a constant voltage charge mode when the charge state of the load reaches a predetermined state.

13 Claims, 6 Drawing Sheets

U.S. PATENT DOCUMENTS

| | | | |
|---|---|---|---|
| 2007/0210756 A1* | 9/2007 | Choi et al. | 320/128 |
| 2007/0216357 A1* | 9/2007 | Ibaraki | 320/128 |
| 2007/0257639 A1* | 11/2007 | D'Arrigo et al. | 320/128 |
| 2008/0136377 A1* | 6/2008 | Zhang | 320/137 |
| 2008/0258689 A1* | 10/2008 | Antheunis et al. | 320/149 |
| 2009/0058393 A1* | 3/2009 | Huang | 323/316 |
| 2009/0224726 A1* | 9/2009 | Arai | 320/163 |
| 2011/0193531 A1* | 8/2011 | Sheng et al. | 320/148 |

FOREIGN PATENT DOCUMENTS

| | | |
|---|---|---|
| JP | 2006-223030 | 8/2006 |
| JP | 2007-221936 | 8/2007 |

* cited by examiner

PRIOR ART

CHARGING CIRCUIT HAVING A SMOOTH
CHARGING TRANSITION MODE
INCLUDING A CURRENT MIRROR BLOCK
CONTROLLED BY A CHARGE MODE
TRANSITION BLOCK COMPRISING SERIES
CONNECTED TRANSISTORS

CROSS-REFERENCE TO RELATED
APPLICATIONS

This U.S. non-provisional patent application claims the benefit of Korean Patent Application 10-2009-0001129, filed on Jan. 7, 2009, in the Korean Intellectual Property Office, the disclosure of which is incorporated herein by reference.

FIELD OF THE INVENTION

The present invention relates to charging circuits, and in particular, to charging circuits that are suitable for charging a battery in a constant current charging mode or a constant voltage charging mode.

BACKGROUND

When a battery is charged by a charger, the battery may be charged rapidly with a large current using a constant current charge mode. In this case, however, the battery (especially, a lithium-ion battery) may be overcharged, so that the lifespan of the battery may be shortened and in a worst case scenario, the battery may catch fire.

Accordingly, in order to protect the battery, if the voltage increases close to the full charge state, the battery is charged with a prescribed constant voltage such that the charge current is naturally reduced. This charge mode is called a constant voltage charge mode.

In the case of a lithium-ion battery, if the battery voltage reaches, for example, 4.2 V, the charge mode is switched from the constant current charge mode (CCCM) to the constant voltage charge mode (CVCM). However, a rapid and/or large change in the charge current may adversely affect the battery, so it is desirable that the battery voltage be regulated naturally to 4.2 V while the charge current is kept constant.

Conventionally, a programmable resistor or switch is used to switch the charge mode from constant current charge mode to constant voltage charge mode.

However, the rapid transition of the charge mode using a programmable resistor or switch may lead to a rapid change in the charge current, which may shorten the lifespan of the battery.

Accordingly, a technique is known which uses a diode as a charge mode transition element in order to suppress the rapid transition of the charge mode. In this case, however, the use of the diode may increase the occupying area of the charging circuit as well as the manufacturing cost thereof, and a bias current may be needed.

SUMMARY

A charging circuit according to some embodiments includes a current mirror block that charges a load in response to a control voltage applied thereto and a charge controller that generates the control voltage in response to comparison result values obtained by comparing a current sensing value and a voltage sensing value of the current mirror block with respective reference values. The comparison result values are applied to the gates of MOS transistors connected in series. The charge controller can switch a charge mode from a constant current charge mode to a constant voltage charge mode when the charge state of the load reaches a set state.

The MOS transistors may include first, second, and third P-channel MOS transistors whose source-drain channels are connected in series between a power supply voltage and the ground. A bias voltage may be connected to the gate of the first P-channel MOS transistor, and each of the comparison result values may be applied to the gate of a corresponding one of the second and third P-channel MOS transistors. The control voltage may be obtained from the drain of the first P-channel MOS transistor.

The MOS transistors may include first, second, and third N-channel MOS transistors whose drain-source channels are connected in series between a power supply voltage and the ground. Each of the comparison result values may be applied to the gate of a corresponding one of the first and second N-channel MOS transistors. A bias voltage may be applied to the gate of the third N-channel MOS transistor, and the control voltage may be obtained from the drain of the second N-channel MOS transistor.

The current mirror block may include current mirror-type first and second P-channel MOS transistors whose sources are connected commonly to the power supply voltage and whose gates are connected commonly to the control voltage. The charging circuit may further include a fourth P-channel MOS transistor that receives a temperature sensing result signal through the gate thereof. The source-drain channel of the fourth P-channel MOS transistor may be connected between the third P-channel MOS transistor and the ground.

A charging circuit according to further embodiments includes a current mirror block that supplies a current to a load in response to a control voltage, thereby charging the load connected to an output node. A current regulation block compares a voltage on a sensing node of the current mirror block with a prescribed reference voltage corresponding to a reference current, and outputs a first comparison result value. A voltage regulation block compares an output voltage on an output node of the current mirror block with a prescribed reference voltage, and outputs a second comparison result value. A charge mode transition block generates the control voltage for regulating the current mirror block in a single feedback loop in response to the first comparison result value and the second comparison result value, which are input to the gates of MOS transistors whose channels are connected in series, such that transition of a charge mode with respect to the load is performed smoothly.

The MOS transistors may include first, second, and third P-channel MOS transistors whose source-drain channels are connected in series between a power supply voltage and the ground. A bias voltage may be applied to the gate of the first P-channel MOS transistor, and the first and second comparison result values may be respectively applied to the gates of the third and second P-channel MOS transistors. The control voltage may be obtained from the drain of the first P-channel MOS transistor.

The MOS transistors may include first, second, and third N-channel MOS transistors whose drain-source channels are connected in series between a power supply voltage and the ground, and the first and second comparison result values may be respectively applied to the gates of the first and second N-channel MOS transistors. A bias voltage may be applied to the gate of the third N-channel MOS transistor. The control voltage may be obtained from the drain of the second N-channel MOS transistor.

The MOS transistors may include first, second, and third P-channel MOS transistors whose source-drain channels are connected in series between a power supply voltage and a ground, and for use in a low drop-out regulator. A bias voltage may be applied to the gate of the first P-channel MOS transistor, and the first and second comparison result values may be respectively applied to the gates of the second and third P-channel MOS transistors. The control voltage may be obtained from the drain of the first P-channel MOS transistor.

The charging circuit may further include a temperature regulation block that senses an increase in the temperature of the circuit above a predetermined temperature and that disables the charge mode transition block so as to cut off the charging operation of the current mirror block.

BRIEF DESCRIPTION OF THE DRAWINGS

The above and other features and advantages will become more apparent by describing in detail example embodiments thereof with reference to the attached drawings in which.

DETAILED DESCRIPTION

Figure 1:
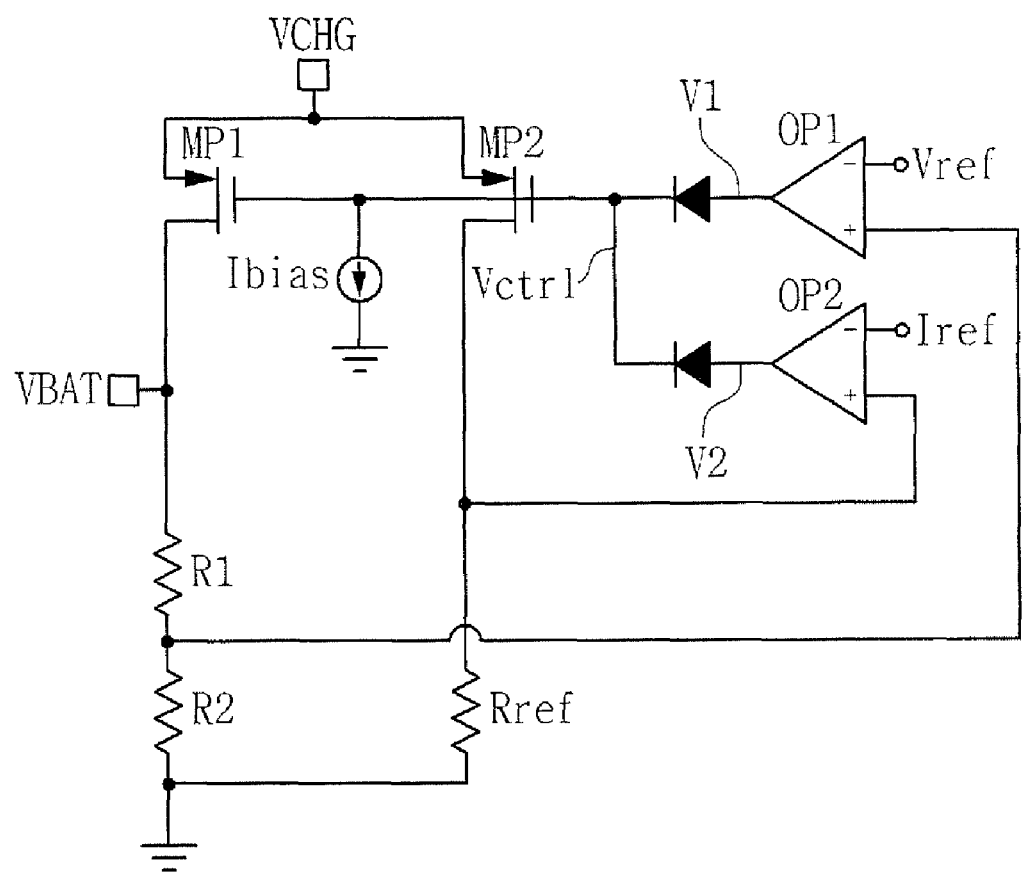
FIG. 1 is a circuit diagram of a conventional charging circuit.

Exemplary embodiments of a charging circuit having a smooth charging transition mode will now be described with reference to the accompanying drawings.

Specific structural and functional details disclosed herein are merely representative for purposes of describing example embodiments. Example embodiments may, however, may be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second and third may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of this specification and the relevant art and should not be interpreted in an idealized or overly formal sense unless expressly so defined herein.

First, in order to clearly explain the differences from the embodiments of the invention, the related art will be described briefly with reference to FIG. 1.

FIG. 1 shows a conventional charging circuit. This charging circuit is a battery charging circuit which uses a diode as a charge mode transition element in order to reduce the rapid switching of the charge mode. The charging circuit shown in FIG. 1 is a battery charger which includes a current mirror block having P-channel MOS transistors MP1 and MP2, operational amplifiers OP1 and OP2, and diodes. This is commercially available from Texas Instruments Inc. (Single-Chip Charge and System Power-Path Management IC, Product part No. bq24032).

Brief description will be provided for the operation principle of the circuit shown in FIG. 1. The control voltage Vctrl on the node to which the cathodes of two diodes are commonly connected follows the higher voltage of the anode voltages V1 and V2 of the diodes, and accordingly the diode having a relatively low anode voltage is turned off. In the CCCM, the voltage V2 becomes higher than the voltage V1, so the feedback loop having the MOS transistor MP2 and the operational amplifier OP2 is operated, and the feedback loop having the MOS transistor MP1 and the operational amplifier OP1 is not operated.

In the CVCM, the voltage V1 becomes larger than the voltage V2, so the feedback loop having the MOS transistor MP2 and the operational amplifier OP2 naturally stops operation, and the feedback loop having the MOS transistor MP1 and the operational amplifier OP1 is operated. When this happens, the voltage VBAT is regulated to a predefined voltage $(((R1+R2)*Vref)/R2)$.

However, the circuit shown in FIG. 1 is provided with the diodes therein, which leads to an increase in the area and costs. Further, a bias current Ibias needs to be applied in order to keep one of the two diodes turned on.

As described above, in the case of the circuit shown in FIG. 1, which uses a diode as a charge mode transition element in order to reduce the rapid transition of the charge mode, the use of the diode causes an increase in the occupying area and costs, and the bias current is needed.

Figure 2:
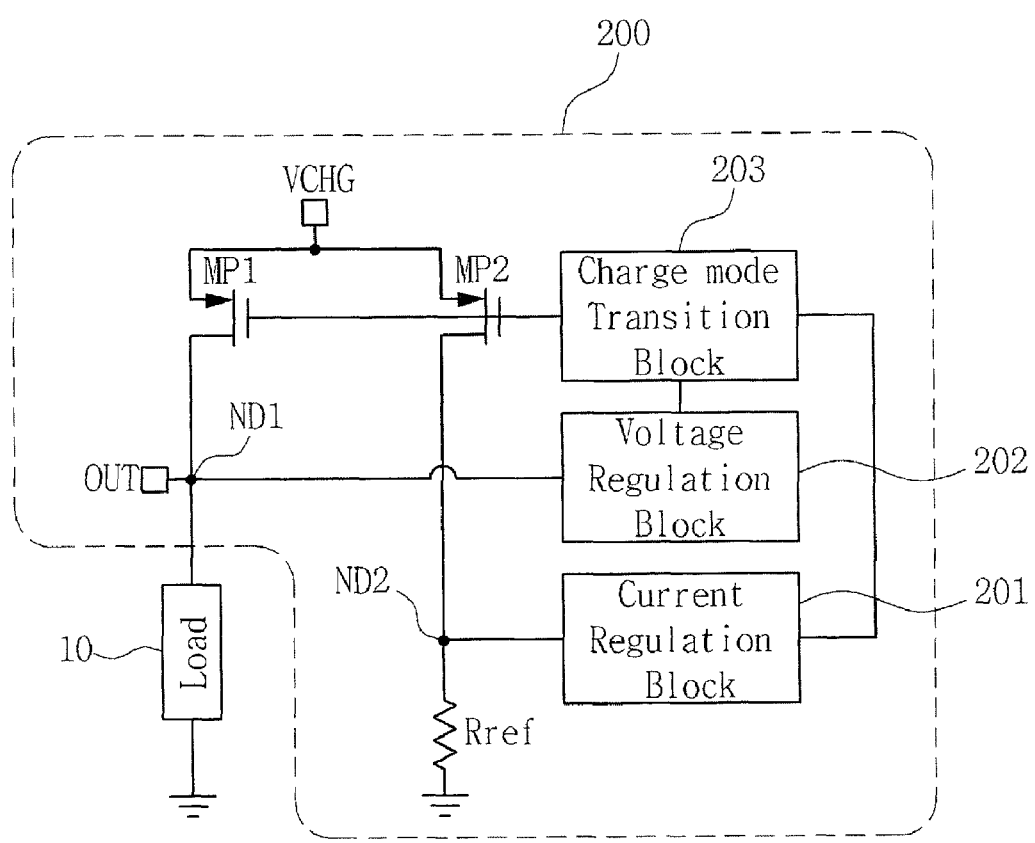
FIG. 2 is a block diagram of a charging circuit according to some embodiments.

Accordingly, an embodiment of the invention provides a circuit shown in FIG. 2. FIG. 2 shows a charging circuit according to an embodiment of the invention. Referring to FIG. 2, a scheme is shown in which a regulated current according to a load current and a load voltage is supplied to a load.

The circuit shown in FIG. 2 supplies a regulated current according to the current and voltage of a load to the load. This circuit can be mainly used to switch the charge mode from the constant current charge mode to the constant voltage charge mode when the battery is charged by the battery charger.

Referring to FIG. 2, a current mirror block supplies current to the load in response to a control voltage in order to charge a load 10 connected to an output node ND1. The current mirror block includes current mirror-type first and second P-channel MOS transistors MP1 and MP2 whose sources are connected commonly to a power supply voltage VCHG and whose gates are connected commonly to the control voltage.

When the charge state of the load 10 reaches a set state, in order to switch the charge mode from the constant current charge mode to the constant voltage charge mode, a charge controller generates, as the control voltage, a result voltage which is obtained when comparison result values obtained by comparing a current sensing value and a voltage sensing value of the current mirror block with respective reference values are applied to the gates of the MOS transistors which are connected in series. The charge controller includes circuit blocks 201, 202, and 203 shown in FIGS. 3 and 4.

Figure 3:
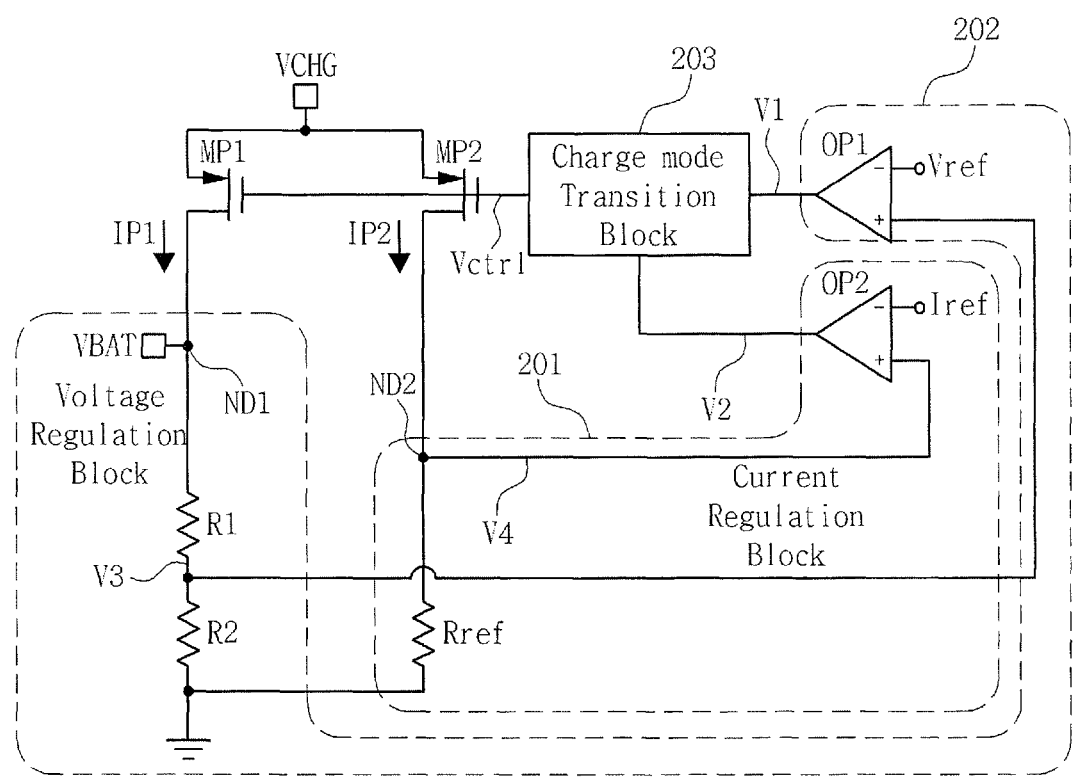
FIG. 3 is a detailed circuit diagram illustrating a charging circuit in FIG. 2 according to some embodiments.
Figure 4:
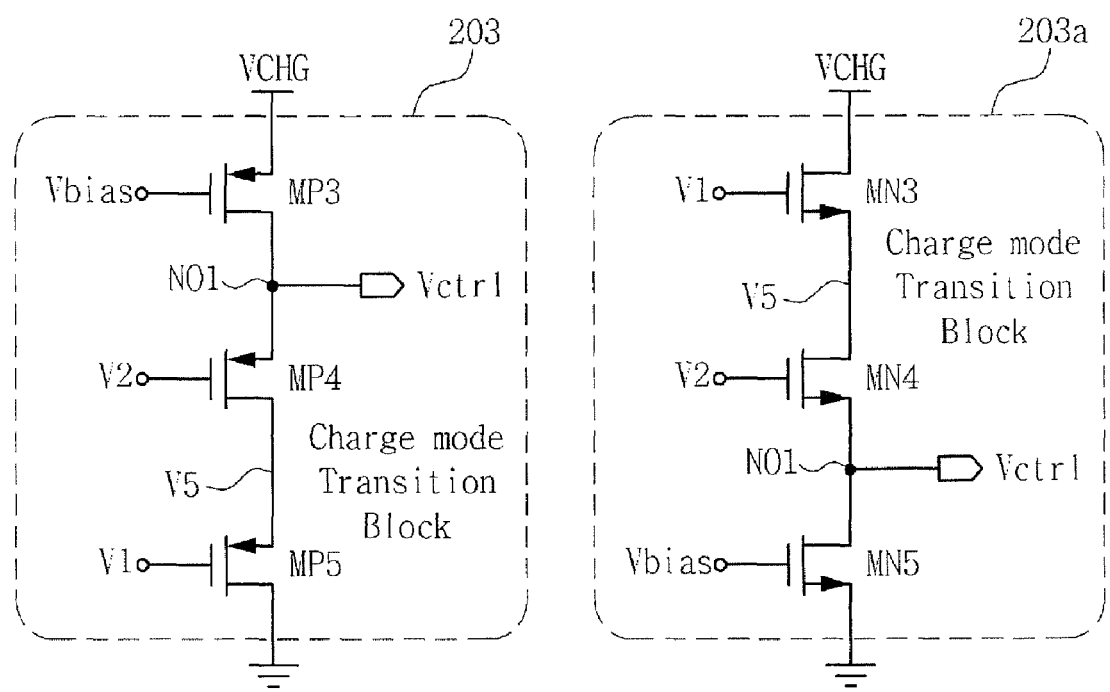
FIG. 4 is a circuit diagram illustrating a charge mode transition block in FIG. 2 or 3 according to some embodiments.

FIG. 3 is a detailed circuit diagram showing a specific example of a charging circuit in FIG. 2. FIG. 4 is a circuit diagram showing examples of a charge mode transition block in FIG. 2 or 3.

As shown in FIG. 3 in detail, a current regulation block 201 includes a resistor Rref and an operational amplifier OP2. The current regulation block 201 compares the voltage on a current sensing node ND2 of the current mirror block with a prescribed reference voltage corresponding to a reference current Iref, and outputs a first comparison result value V2.

The voltage regulation block 202 includes resistors R1 and R2, and an operational amplifier OP1. The voltage regulation block 202 compares the output voltage on the output node ND1 of the current mirror block with a prescribed reference voltage Vref, and outputs a second comparison result value V1.

In order to ensure the smooth transition of the charge mode with respect to the load, the charge mode transition block 203 generates the control voltage Vctrl for regulating the current mirror block in a single feedback loop which is variably determined on the basis of the first comparison result value V2 and the second comparison result value V1, which are input to the gates of MOS transistors (for example, MOS transistors MP4 and MP5 in a charge mode transition block 203 of FIG. 4, or MOS transistors MN4 and MN3 in a charge mode transition block 203a of FIG. 4) whose channels are connected in series.

As shown in FIG. 4, the charge mode transition block 203 includes the MOS transistors (the MOS transistors MP3, MP4, and MP5 in the charge mode transition block 203 of FIG. 4, or the MOS transistors MN5, MN4, and MN3 in the charge mode transition block 203a of FIG. 4) whose channels are connected in series.

In particular, referring to the charging circuit 203 illustrated in FIG. 4, a first p-channel MOS transistor MP3 has a source connected to a power supply voltage VCHG and a drain connected to node N01. A second p-channel MOS transistor MP4 has a source connected to node N01, and a third p-channel MOS transistor MP5 has a source connected to the drain of the second p-channel MOS transistor and a drain connected to ground. A bias voltage Vbias is applied to the gate of the first p-channel MOS transistor MP3. The first and second comparison result values V2, V1 are applied respectively to the gates of the second and third p-channel MOS transistors MP4, MP5. The control voltage Vctrl is taken from node N01.

Referring to the charging circuit 203a illustrated in FIG. 4, a first n-channel MOS transistor MN3 has a drain connected to a power supply voltage VCHG. A second n-channel MOS transistor MP4 has a drain connected to the source of the first n-channel MOS transistor MN3 and a source connected to node N01 from which the control voltage Vctrl is taken. A third n-channel MOS transistor MN5 has a drain connected to node N01 and a source connected to ground. A bias voltage Vbias is applied to the gate of the third n-channel MOS transistor MN5. The first and second comparison result values V2, V1 are applied respectively to the gates of the second and first n-channel MOS transistors MN4, MN3.

By using a charge mode transition circuit as described above to generate the control voltage Vctrl, smooth transition from a current regulation mode of operation to a voltage regulation mode operation may be implemented, and rapid transition of the charge mode may be reduced or avoided. The detailed operation will be described below.

Figure 5:
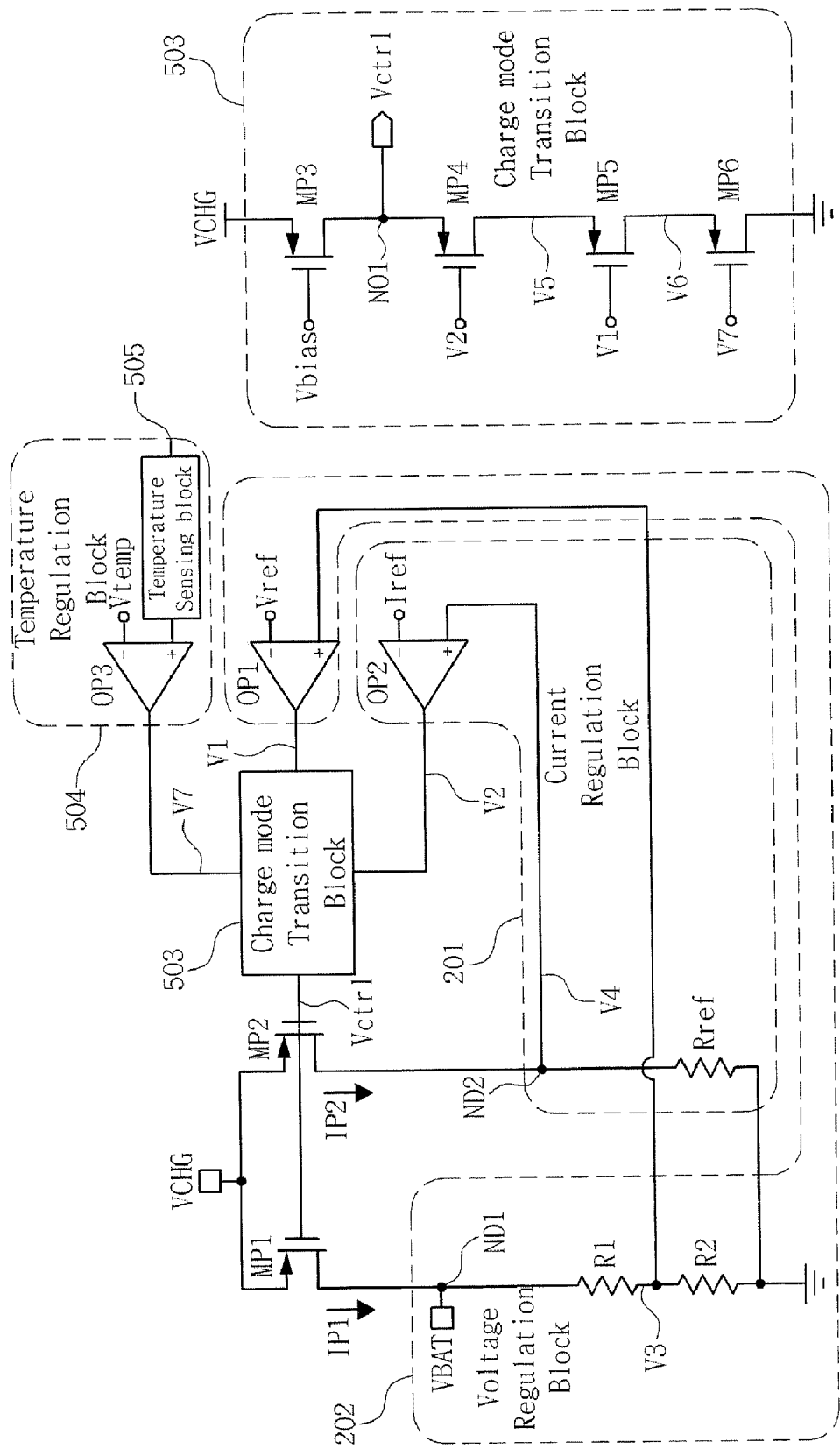
FIG. 5 is a circuit diagram of a charging circuit according to further embodiments.

FIG. 5 is a circuit diagram showing a charging circuit according to another embodiment of the invention. The charging circuit shown in FIG. 5 is further provided with a temperature regulation block 504 which senses an increase in the temperature of the circuit above a predetermined constant, and disables the charge mode transition block 503 so as to cut off the charging operation of the current mirror block, as compared to the circuit shown in FIG. 3. In this case, unlike the charge mode transition block shown in FIG. 4, the charge mode transition block 503, for example, a charge mode transition block 503 on the right side of FIG. 5 includes four P-channel MOS transistors MP3, MP4, MP5, and MP6.

Figure 6:
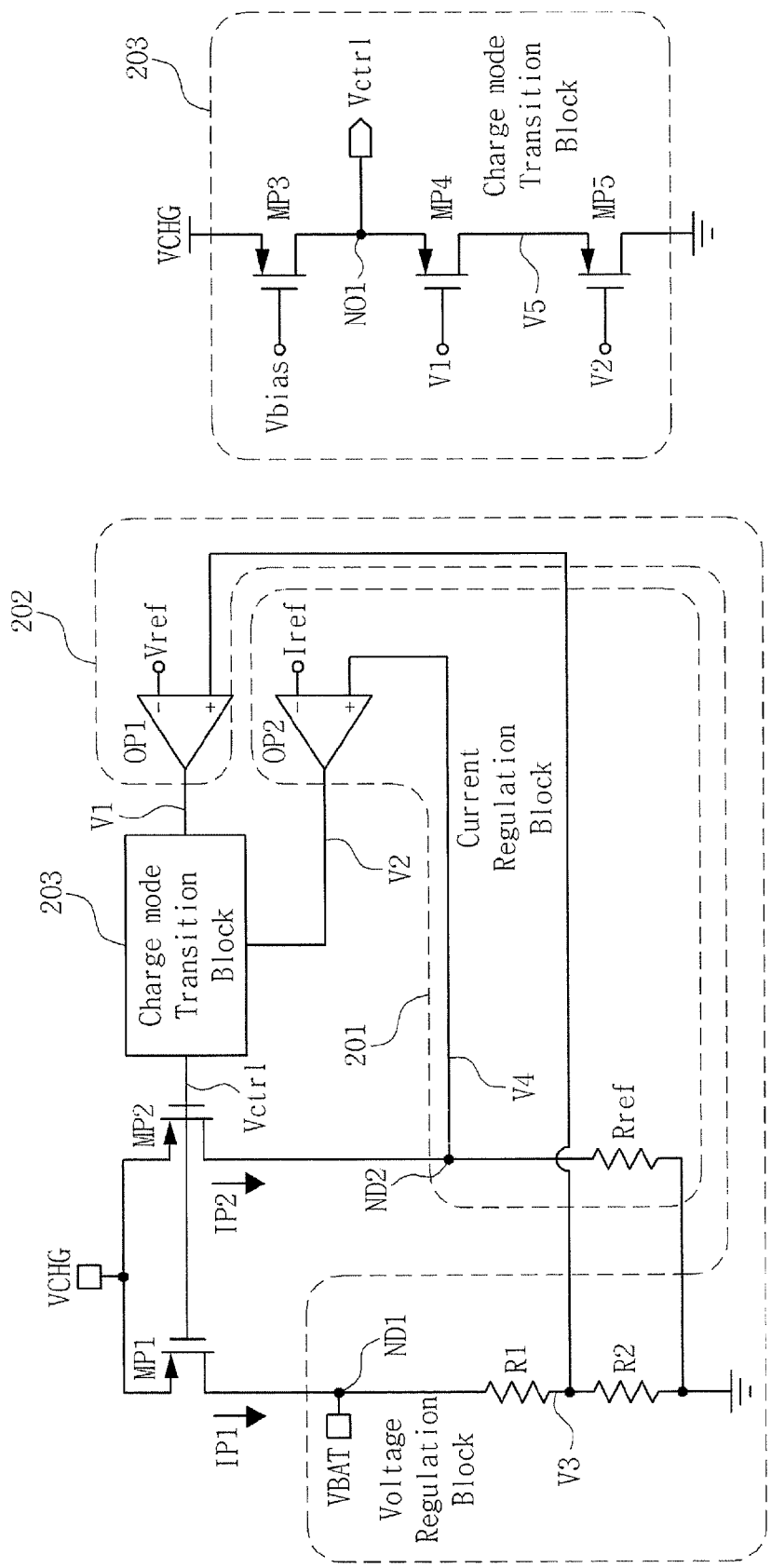
FIG. 6 is a detailed circuit diagram showing a modification of the charging circuit of FIG. 3.

FIG. 6 is a detailed circuit diagram showing a modification of FIG. 3. Specifically, FIG. 6 shows the configuration which a load current is limited by a low drop-out (LDO) regulator, as a modification of the circuit shown in FIG. 3.

Referring to FIG. 6, the second comparison result value is applied to the gate of the P-channel MOS transistor MP4 in the charge mode transition block 203, and the first comparison result value V2 is applied to the gate of the P-channel MOS transistor MP5. This connection is opposite to the connection shown in FIG. 4.

Hereinafter, the operation principle where the smooth transition from the current regulation operation to the voltage regulation operation is realized while the rapid transition of the charge mode is suppressed will be described in detail.

Returning to FIG. 2, the current mirror block is provided in the charging circuit 200, and includes the first P-channel MOS transistor MP1 supplying a current to the load 10, and the second P-channel MOS transistor MP2 sensing a current flowing in the first P-channel MOS transistor MP1. The sensing node ND2 is provided at one node of the resistor Rref which is connected between the drain of the second P-channel MOS transistor MP2 and the ground, such that a voltage corresponding to the current flowing in the MP1 is sensed on the sensing node ND2.

The current regulation block 201 compares the voltage sensed on the sensing node ND2 by the resistor Rref with a prescribed reference voltage, and outputs the first comparison result value (V2 in FIG. 3).

The voltage regulation block 202 compares a voltage, which is in proportion to the output voltage on the output node ND1, with a prescribed reference voltage, and outputs the second comparison result value (V1 in FIG. 3).

The charge mode transition block 203 receives the first and second comparison result values from the current regulation block 201 and the voltage regulation block 202, and generates the control voltage for regulating the first and second P-channel MOS transistors MP1 and MP2 of the current mirror block. The generated control voltage is applied to the gates of the first and second MOS transistors MP1 and MP2 of the current mirror block.

According to the embodiment of the invention, the specific circuits that can be implemented in the battery charger are shown in FIGS. 3 and 4.

Prior to describing the operation principle in FIG. 3 in detail, the reference current Iref and the reference voltage Vref are defined as follows: the reference current Iref is a predefined current which is used to regulate the current, which is charged in the battery during the CCCM; and the reference voltage Vref is a predefined voltage which is used to regulate the voltage of the battery in the CVCM.

Referring to FIG. 3, in the CCCM, if the reference voltage Vref of the operational amplifier OP1 is higher than the voltage V3, and the reference current Iref of the operational amplifier OP2 is higher than the voltage V4, the voltages V1 and V2 both become zero. Then, the MOS transistor MP5 in the charge mode transition block 203 is operated in the saturation region, and the voltage V5 is kept at a voltage which is higher than the ground voltage by a threshold voltage Vth of the MOS transistor MP5. Similarly to the MOS transistor MP5, if a voltage which is higher than the gate voltage of the MOS transistor MP4 by the threshold voltage Vth is applied to the source of the MOS transistor MP4, a current flowing in the MOS transistor MP2 increases due to the low control voltage Vctrl, and thus the voltage V4 increases. Therefore, the control voltage Vctrl is adjusted by the feedback loop having the current regulation block 201 and the MOS transistor MP2 such that a predefined current (IP2=Iref/Rref) flows in the MOS transistor MP2, and as a result, a current IP1 flowing in the MOS transistor MP1 is regulated by the current mirror operation. If the width/length ratio of each of the MOS transistors MP1 and MP2 is K, then a current Ichg which is charged in the battery is as follows.

$$Ichg = K \times IP2 = \frac{K \times Iref}{Rref} \qquad \text{[Equation 1]}$$

Prior to describing the transition process of the charge mode from the CCCM to the CVCM, the battery voltage Vreg that is regulated in the CVCM may be defined as follows.

$$Vreg = \frac{(R1 + R2) \times Vref}{R2} \qquad \text{[Equation 2]}$$

In the CCCM, if the voltage on the node VBAT gradually increases and approximates the voltage Vreg, the voltages Vref and V3 which are input to the operational amplifier OP1 substantially become identical, and the output voltage V1 of the operational amplifier OP1 gradually increases from zero. The increase in the voltage V1 causes an increase in the voltage V5 in the charge mode transition block 203 and substantially becomes identical to the control voltage Vctrl, and the MOS transistor MP4 of the charge mode transition block 203 passes through the linear region and is turned off. Therefore, the control voltage Vctrl increases along with the voltage V5, and the feedback loop for current regulation stops operation. As a result, a current IP2 flowing in the MOS transistor MP2 decreases, and the voltage V4 also decreases. Subsequently, the output voltage V2 of the operational amplifier OP2 reaches zero, and the MOS transistor MP4 of the charge mode transition block 203 is turned on as a switch.

As described above, the feedback loop which is formed by the operational amplifier OP1 of the voltage regulation block 202, the MOS transistor MP5 of the charge mode transition block 203, and the MOS transistor MP1 shown in FIG. 3 is operated, so the battery voltage VBAT is regulated to the predefined voltage Vreg. In this way, the CCCM is naturally switched to the CVCM, without using a diode in the circuit, so that damage to the battery can be reduced or avoided.

FIG. 5 shows as another embodiment of the invention a battery charger which uses the temperature regulation block 504. In general, the charger supplies a large amount of current to the battery, so overheating often occurs. Accordingly, a circuit needs to be provided which reduces the amount of current of the charger at a high temperature (typically, 120° C. or higher).

Brief description will be made for the operation principle of the charging circuit in FIG. 5. The circuit blocks other than the charge mode transition block 503 and the temperature regulation block 504 are the same as those shown in FIG. 3.

First, a circuit for sensing an increase in the temperature, that is, a temperature sensing block 505, needs to be provided. A general bandgap reference circuit is used to generate a PTAT (Proportional To Absolute Temperature) current and to cause the generated current to flow in a resistor, thereby generating a voltage. This will be easily implemented by a general method, and thus the detailed description thereof will be omitted.

In order to match a voltage at a required temperature with a reference voltage Vtemp which is defined by the bandgap reference circuit, the slope of the PTAT current and the resistor used are adjusted.

Similarly to the operation of the current regulation block 201 or the voltage regulation block 202 in FIG. 3 or 5, the output voltage V7 of the temperature regulation block 504 is kept zero at a temperature lower than a predefined high temperature, and if the temperature of the charger increases and the output voltage of the temperature sensing block 505 approximates the reference voltage Vtemp, the voltage V7 gradually increases. If the voltage V7 becomes higher than the reference voltage Vtemp and approximates the control voltage Vctrl, the gate voltages of the MOS transistors MP4 and MP5 in the charge mode transition block 503 become zero, regardless of the charge mode (CCCM or CVCM), such that the MOS transistors MP4 and MP5 are turned on. Accordingly, the feedback loop stops operation, and if the temperature further increases, the control voltage Vctrl reaches the voltage VCHG. Thus, the MOS transistors MP1 and MP2 of the charger are turned off.

The circuit shown in FIG. 6 is a modification of the circuit shown in FIG. 3, and may be used in the low drop-out (LDO) regulator. The LDO regulator is used to generate a lower power supply voltage from a higher supply voltage. When an application needs to be provided to limit the load current, like FIG. 6, if the outputs V1 and V2 of the operational amplifiers OP1 and OP2 in FIG. 3 are reversed, a desired circuit can be easily implemented.

Similarly, if the voltages V1 and V2 both become zero, the voltage regulation block 202 is first operated to regulate the voltage on the node VBAT to the predefined voltage Vreg. If the load current increases and becomes larger than the predefined current Ichg, the MOS transistor MP4 is turned on, and the feedback loop which is formed by the MOS transistors MP5 and MP2 and the current regulation block 201 is operated. Thus, the control voltage Vctrl is adjusted such that the load current is regulated to the current Ichg.

Although in the embodiments of the invention, the charge controller is implemented by MOS transistors connected in series, it should be understood that in some cases, other circuit elements may be used.

As described above, a charging circuit according to some embodiments can reduce rapid changes in a charge current at the time of a charge mode transition. Furthermore, a charging circuit according to some embodiments may have a smooth charging transition mode without using a diode, and/or can reduce the occupying area of circuit elements and manufacturing costs when a current mirror block having MOS transistors is provided in the charging circuit.

According to some embodiments, a charging circuit is provided in which a circuit element for charge mode transition is implemented using the same type of MOS transistors as the MOS in a current mirror circuit of the charging circuit.

Still further embodiments provide charging circuits which can detect overheating of the charging circuit and disable charging in response to detected heating to ensure the stable operation of the charger. Further embodiments provide charging circuits which can be used as a low drop-out regulator.

Although the embodiments of the invention have been described with reference to the drawings, it will be obvious to those skilled in the art that various changes and modifications may be made without departing from the technical spirit and scope of the invention. For example, in some cases, the internal circuit configuration or the element connection may be modified without departing from the technical spirit and scope of the invention.

Although the invention is disclosed in the context of a battery charger, the invention may be applied to other current limiting circuits.

What is claimed is:

1. A charging circuit comprising:
a current mirror block configured to charge a load in response to a control voltage applied thereto; and
a charge controller configured to generate the control voltage in response to comparison result values obtained by comparing a current sensing value and a voltage sensing value of the current mirror block with respective reference values, wherein the comparison result values are applied to the gates of MOS transistors connected in series, and wherein the charge controller is configured to switch a charge mode from a constant current charge mode to a constant voltage charge mode when a charge state of the load reaches a predetermined state;
wherein the MOS transistors include first, second, and third MOS transistors, a bias voltage is connected to a gate of the first MOS transistor, each of the comparison result values is applied to a gate of a corresponding one of the second and third MOS transistors, and the control voltage is obtained from a node between the first MOS transistor and the second and third MOS transistors.

2. The charging circuit of claim 1, wherein the first, second, and third MOS transistors have source-drain channels connected in series between a power supply voltage and ground, and the MOS transistors are P-channel MOS transistors.

3. The charging circuit of claim 2, wherein the current mirror block includes current mirror-type first and second P-channel MOS transistors having respective sources connected to the power supply voltage and respective gates connected to the control voltage.

4. The charging circuit of claim 2, further comprising:
a fourth P-channel MOS transistor configured to receive a temperature signal at a gate thereof, wherein a source-drain channel of the fourth P-channel MOS transistor is connected between the third P-channel MOS transistor and the ground.

5. The charging circuit of claim 1, wherein the first, second, and third MOS transistors have source-drain channels connected in series between a power supply voltage and ground, and the MOS transistors are N-channel MOS transistors.

6. A charging circuit having a smooth charging transition mode comprising:
a current mirror block configured to supply current to a load connected to an output node in response to a control voltage, thereby charging the load;
a current regulation block configured to compare a voltage at a current sensing node of the current mirror block with a first reference voltage corresponding to a reference current, and to output a first comparison result value;
a voltage regulation block configured to compare an output voltage at a voltage sensing node of the current mirror block with a second reference voltage, and to output a second comparison result value; and
a charge mode transition block configured to generate the control voltage for regulating the current mirror block in a single feedback loop in response to the first comparison result value and the second comparison result value, which are input to the gates of MOS transistors having channels connected in series;
wherein the MOS transistors include first, second, and third MOS transistors, a bias voltage is applied to a gate of the first MOS transistor, each of the comparison result values is applied to a gate of a corresponding one of the second and third MOS transistors, and the control voltage is obtained from a node between the first MOS transistor and the second and third MOS transistors.

7. The charging circuit of claim 6, wherein the first, second, and third MOS transistors have source-drain channels connected in series between a power supply voltage and ground, and the MOS transistors are P-channel MOS transistors.

8. The charging circuit of claim 6, wherein the third, second, and first MOS transistors have source-drain channels connected in series between a power supply voltage and ground, and the MOS transistors are N-channel MOS transistors.

9. The charging circuit of claim 6, further comprising:
a temperature regulation block configured to sense an increase in a temperature of the circuit and to responsively disable the charge mode transition block so as to cut off the charging operation of the current mirror block.

10. A charging circuit comprising:
a current mirror circuit configured to charge a load in response to a charge control signal applied thereto;
a current regulation circuit configured to generate a current regulation signal in response to a current flowing in the current mirror block;

a voltage regulation circuit configured to generate a voltage regulation signal in response to a voltage of the current mirror block; and a charge mode transition circuit configured to generate a charge control signal in response to the voltage regulation signal and the current regulation signal, the charge mode transition circuit comprising first, second and third MOS transistors connected in series;

wherein the current regulation signal is applied to a gate of the first MOS transistor, the voltage regulation signal is applied to a gate of the second MOS transistor, the control voltage is obtained from a source of the first MOS transistor, and a bias voltage is connected to a gate of the third MOS transistor.

11. The charging circuit of claim 10, wherein a drain of the third MOS transistor is connected to the source of the first MOS transistor, a drain of the first MOS transistor is connected to a source of the second MOS transistor, a drain of the second MOS transistor is connected to ground, and the first, second, and third MOS transistors are P-channel MOS transistors.

12. The charging circuit of claim 11, further comprising:
a fourth P-channel MOS transistor configured to receive a temperature signal at a gate thereof, wherein a source-drain channel of the fourth P-channel MOS transistor is connected between the third P-channel MOS transistor and ground.

13. The charging circuit of claim 10, wherein a source of the first MOS transistor is connected to a drain of the second MOS transistor, the source of the second MOS transistor is connected to a drain of the third MOS transistor, a source of the third MOS transistor is connected to ground and the first, second, and third MOS transistors are N-channel MOS transistors.

* * * * *